US008828472B2

(12) United States Patent
Martinsen

(10) Patent No.: US 8,828,472 B2
(45) Date of Patent: Sep. 9, 2014

(54) FOOD PRODUCTS CONTAINING OMEGA-3 FATTY ACIDS

(75) Inventor: Bo Martinsen, Osprey, FL (US)

(73) Assignee: Ambo Innovations, LLC, Osprey, FL (US)

( * ) Notice: Subject to any disclaimer, the term of this patent is extended or adjusted under 35 U.S.C. 154(b) by 648 days.

(21) Appl. No.: 12/867,087

(22) PCT Filed: Feb. 12, 2009

(86) PCT No.: PCT/US2009/033883
§ 371 (c)(1),
(2), (4) Date: Oct. 19, 2010

(87) PCT Pub. No.: WO2009/102845
PCT Pub. Date: Aug. 20, 2009

(65) Prior Publication Data
US 2011/0033602 A1    Feb. 10, 2011

Related U.S. Application Data

(60) Provisional application No. 61/028,028, filed on Feb. 12, 2008.

(51) Int. Cl.
| A23D 9/00 | (2006.01) |
| A23L 2/02 | (2006.01) |
| A23L 1/30 | (2006.01) |
| A23L 1/308 | (2006.01) |

(52) U.S. Cl.
CPC ............. *A23L 1/3008* (2013.01); *A23L 2/02* (2013.01); *A23L 1/3006* (2013.01); *A23L 1/308* (2013.01)
USPC ........................... 426/601; 426/599; 424/439

(58) Field of Classification Search
USPC .................................. 426/601, 599
See application file for complete search history.

(56) References Cited

U.S. PATENT DOCUMENTS

| 5,012,761 A * | 5/1991 | Oh .................................. 119/6.8 |
| 5,415,879 A * | 5/1995 | Oh ...................................... 426/2 |
| 6,056,984 A * | 5/2000 | Ekanayake et al. ........... 426/120 |
| 6,759,073 B2 | 7/2004 | Heisey et al. |
| 7,041,324 B2 * | 5/2006 | Myhre ............................ 426/72 |
| 2003/0021878 A1 | 1/2003 | Nunes et al. |
| 2005/0233045 A1 | 10/2005 | Aldred et al. |
| 2007/0098854 A1 | 5/2007 | Van Lengerich et al. |
| 2008/0020102 A1 * | 1/2008 | Karwe et al. .................. 426/106 |
| 2009/0162524 A1 * | 6/2009 | Rivera et al. .................. 426/599 |
| 2010/0092617 A1 * | 4/2010 | Whittle ........................... 426/73 |

FOREIGN PATENT DOCUMENTS

| EP | 0713653 | * | 5/1996 |
| WO | 91/17670 A1 | | 11/1991 |
| WO | 01/47377 A2 | | 7/2001 |
| WO | 2004/105517 A1 | | 12/2004 |
| WO | 2007/008384 A2 | | 1/2007 |
| WO | 2007/060947 A2 | | 5/2007 |
| WO | 2007/124993 A1 | | 11/2007 |
| WO | 2007/149592 A2 | | 12/2007 |
| WO | 2008/022131 A1 | | 2/2008 |
| WO | 2009/085921 A1 | | 7/2009 |

OTHER PUBLICATIONS

Rombauer, I. S. et al. 1975. Joy of Cooking. Penguin Group, New York. p. 543, 591, 624 & 698.*
International Search Report for Application No. PCT/US2009/033883, dated Nov. 27, 2009.
International Preliminary Report on Patentability for Application No. PCT/US2009/033883, dated Aug. 11, 2010.
European Supplementary Search Report for Application No. 09711049.8, dated Nov. 23, 2011.

* cited by examiner

*Primary Examiner* — Carolyn Paden
(74) *Attorney, Agent, or Firm* — Nelson Mullins Riley & Scarborough LLP; Jane E. Remillard, Esq.

(57) ABSTRACT

The present invention relates to food products having a high omega-3 fatty acid content, as well as methods of preparing those food products.

25 Claims, No Drawings

FOOD PRODUCTS CONTAINING OMEGA-3 FATTY ACIDS

RELATED APPLICATION

This application claims priority to U.S. Provisional application No. 61/028,028, filed Feb. 12, 2008, entitled "FOOD PRODUCTS CONTAINING OMEGA-3 FATTY ACIDS." The contents of any patents, patent applications, and references cited throughout this specification are hereby incorporated by reference in their entireties.

FIELD OF THE INVENTION

The present invention relates to food products having a high omega-3 fatty acid content, which are capable of being cooked without substantial separation of the omega-3 fatty acid, as well as methods of preparing those food products. The products can have a variety of flavors, and serve as a vehicle for the delivery of a number of nutritious and therapeutic ingredients.

BACKGROUND OF THE INVENTION

The human body is capable of producing most of the saturated fatty acids that it requires. Certain polyunsaturated, omega-3 fatty acids, however, cannot be synthesized and must be supplied through diet. For this reason, these fatty acids are referred to as essential fatty acids. Certain foods, such as fish oil, provide the essential fatty acids, and have the advantage of directly offering a consumer eicosapentaenoic acid (EPA) and docosahexaenoic acid (DHA), thereby bypassing the often inefficient biochemical synthesis of these compounds from alpha linolenic acid (ALA).

Research has shown that these fatty acids reduce the risk of heart disease, and have a positive effect on children's development when taken at sufficient amounts. Results have also been published indicating that these fatty acids have a positive effect on certain mental illnesses, autoimmune diseases, joint complaints, and weight control. There are, therefore, many reasons for taking dietary supplements containing omega-3 fatty acid sources, such as fish oil. However, many people consider the taste and texture of these oils to be unpleasant. Furthermore, oils high in omega-3 fatty acid are susceptible to oxidation, which results in reduced health benefits and increased unpleasant odor and taste. Food manufacturers have added omega-3 fatty acids to food products, thereby concealing their unpleasant taste. However, because omega-3 fatty acids separate out of food products when added in high amounts and/or easily oxidize, most products contain amounts that are far below the required health-benefiting dose of at least 750 mg EPA/DHA per day.

Thus, there remains a need for food products that contain high amounts (e.g., 750-4000 mg) of omega-3 fatty acid(s) per serving, as well as a manufacturing process for producing such food products.

SUMMARY OF THE INVENTION

The present invention provides food products, particularly those that are cooked or capable of being cooked, containing high concentrations of omega-3 fatty acids (e.g., 750-4000 mg of ALA, DPA, EPA and/or DHA per serving), without substantial separation or oxidation of the fatty acids. The food products also have the advantage of being free from the unpleasant taste and odor of the omega-3 fatty acids. Furthermore, these products have a high dietary fiber content and a low glycemic index, and can serve as a vehicle for other beneficial vitamins, minerals, nutrients and therapeutics. The products can have a variety of flavors, and serve as a vehicle for the delivery of minerals, vitamins, supplements or medications.

Accordingly, in one aspect, the invention provides a method of producing a homogenous food product having a high omega-3 fatty acid content, wherein the food product is capable of being cooked without substantial separation or oxidation of the omega-3 fatty acid. The method comprises combining a fruit juice concentrate or vegetable juice concentrate with an oil containing an omega-3 fatty acid, preferably in unencapsulated form, to form a liquid mixture, wherein the ratio of oil to concentrated juice is approximately 0.5:4-2:1, e.g., approximately 1:2, by weight; and combining the liquid mixture with a fiber agent to form a solid, edible food product. In a particular embodiment, the ratio of liquid mixture to fiber agent is about 1:2, by weight. In another embodiment, the ratio of oil to concentrated juice is approximately 0.5:4-2:1, e.g., approximately 1:2, by weight. In still another embodiment of the method, the oil comprises approximately 4-20%, e.g., 10-20%, by weight, of the total solid food product.

Suitable fruit juice concentrates that can be employed in the invention include, but are not limited to, concentrated orange juice, concentrated grapefruit juice, concentrated pineapple juice and concentrated cranberry juice. Suitable fruit juice concentrates that can be employed in the invention also include, but are not limited to, concentrated noni juice, concentrated acai juice, concentrated goji juice, concentrated blueberry juice, concentrated blackberry juice, and concentrated raspberry juice. Suitable vegetable juice concentrates that can be employed in the invention include, but are not limited to, concentrated beet, concentrated tomato, or concentrated carrot juice.

Suitable omega-3 containing oils that can be employed in the invention include, but are not limited to, fish oils such as cod liver oil, fish body oil, krill derived oil, anchovy oil, shark liver oil or seal oil, as well as vegetable oils. The oil can also be an algae oil. In one embodiment, the oil that is used to produce the homogenous food product having a high omega-3 fatty acid content contains at least 10%, e.g., at least 30%, omega-3 fatty acid. The oil may also contain EPA and/or DHA. When the oil contains both EPA and DHA, these omega-3 fatty acids can exist in a ratio of about 1:6-6:1, e.g., 1:1-2:3 (EPA:DHA). In a preferred embodiment, the oil is not encapsulated.

Suitable fiber binding agents for use in the invention include, but are not limited to, grains selected from the group consisting of cracked wheat, multi-grain, flour, oats, oat bran, oatmeal, pumpernickel, rye, seven bran, twelve bran, seven grain, nine grain, stoned wheat, whole wheat, wheat berry, whole bran, millet, maze, quinoa, rice pectin, fruit peal, and fruit seeds and combinations thereof.

The manufacturing method of the invention can further include the step of adding additional ingredients to improve consistency, stability and/or taste of the food product. Such additional ingredients include, for example, water, sugar (and/or other natural sweeteners), baking powder, baking soda, salt, eggs, egg whites, nuts and fruit. The ingredients also include spices, such as cinnamon, ginger, cloves, and nutmeg, and proteins like whey and other anti-oxidants.

Other health-benefiting ingredients also can be added to the food produce of the invention, such as water-soluble and/or oil-soluble dietary supplements and/or medicaments. These include, for example, cholesterol lowering drugs, anti-hypertensive drugs, anti-inflammation drugs, pain killers, hormones, antibiotics, antidepressants, antiepileptics, neuroleptics, neurostimulants, libido stimulant drugs, erectile dysfunction drugs, chemotherapy agents, diabetes medication, HIV medication, hair loss medication, weight loss medications, omega-6 derivatives, omega-9 derivates, antioxidants, vitamins, and minerals.

Food products made according to the invention have the advantage of being amenable to being cooked (e.g., baked), without substantial separation or oxidation of the omega-3 fatty acids. Accordingly, in one embodiment, the method further includes the step of cooking the food product. Suitable forms of cooking include, for example, baking, frying, microwaving, grilling and/or any other form of heating.

Food products produced by way of the above-described methods can be in a variety of forms including, but not limited to cookies, muffins, cakes, bread, rolls, biscuits, candies, ice creams, and cereals.

In another aspect, the invention provides a manufactured food product comprising about 750-4000 mg of non-encapsulated omega-3 fatty acid per about 50-150 g serving size. In one embodiment, the serving size of the manufactured food product is about 60-100 g, e.g., about 70 g or 80 g. In another embodiment, the manufactured food product is in the form of a cookie. The manufactured food product can further comprise concentrated orange juice, concentrated pineapple juice, concentrated grapefruit juice, concentrated cranberry juice, or concentrated grape juice. The manufactured food product can further comprise concentrated vegetable juice, such as concentrated beet, concentrated tomato, or concentrated carrot juice. The omega-3 fatty acid source for the manufactured food product can be a fish oil (e.g., cod liver oil, fish body oil, or hill derived oil) or vegetable oil. The oil can contain EPA and/or DHA, or at least 10% omega-3 fatty acid.

In another aspect, the invention provides a manufactured, bite-sized food product comprising about 150-800 mg of non-encapsulated omega-3 fatty acid per about 15-20 g serving size. This bite-sized product can contain any of the ingredients discussed herein, and can take the form of a cookie.

The manufactured food product can comprise a fiber binding agent, wherein the fiber binding agent comprises a grain selected from the group consisting of cracked wheat, multigrain, flour, oats, oat bran, oatmeal, pumpernickel, rye, seven bran, twelve bran, seven grain, nine grain, stoned wheat, whole wheat, wheat berry, whole bran, rice, millet, quinoa, maze, barley, fruit seed flour, and fruit peal flour and combinations thereof. The food product can also comprise sugar, baking powder, baking soda, salt, eggs, egg whites, nuts or fruit. The food product can also comprise spices, such as cinnamon, ginger, cloves, and nutmeg, and proteins like whey and other anti-oxidants. In one embodiment, the manufactured food product additionally includes a water-soluble or oil-soluble medicament or diet supplement, such as cholesterol lowering drugs, antihypertensive drugs, anti-inflammation drugs, pain killers, hormones, anti-depressants, weight loss medications, antioxidants, vitamins, minerals (e.g., calcium and/or magnesium), glucosamine, CoQ-10, and/or green tea.

In another aspect, the invention provides a manufactured food product comprising concentrated fruit juice, non-encapsulated fish oil, sugar, oats, flour, baking soda, baking powder, salt, calcium citrate powder, cinnamon, vanilla extract, and egg whites, and the food product has about 750-4000 mg of omega-3 fatty acid per about 50-150 g serving. In another aspect, the invention provides a manufactured food product comprising oats, whole wheat, baking soda, baking powder, cinnamon, powdered ginger, powdered cloves, calcium citrate, orange peel fiber, xanthan gum, fish oil, concentrated fruit juice, egg white, fruit flavored water, and liquid vitamin D, and the food product has about 750-4000 mg of omega-3 fatty acid per about 50-150 g serving. In one embodiment of these manufactured food products, the manufactured food products are in the form of a cookie.

DETAILED DESCRIPTION OF THE INVENTION

The lack of health-benefiting vitamins and nutrients such as essential fatty acids, dietary fiber, calcium, and vitamin D in the typical western diet has lead to a number of health problems, including obesity, chronic inflammation, heart diseases and mental diseases. Moreover, it is estimated that Americans have only half the amount of omega-3 in their cells compared to the Japanese, who, on average, have the greatest life-spans in the world. In addition, the high EPA/DHA intake in the Japanese culture may explain the low rate of arteriosclerosis in Japan. It is virtually impossible for Americans to reach omega-3 levels found in Japanese societies with a diet of fish alone, because most people are discouraged from ingesting large amounts of fatty fish due to a risk of heavy metal contamination. Thus, there are many reasons for taking dietary supplements containing purified omega-3 fatty acid sources, such as fish oil, to increase levels of EPA/DHA in the cell. However, many people consider the taste or after taste of these oils to be unpleasant, and will resist taking them or using them in adequate amounts, despite strong recommendation from health authorities.

Research has also shown that diets high in dietary fibers, and especially soluble fibers, may have equally positive health effects, such as a reduction in heart disease, certain digestive cancers and weight. It is estimated that most Westerners only ingest half of the recommended daily amount of fiber, which may be due to increased consumption of highly processed foods that contain limited amounts of fiber. Research indicates that low glycemic (a value relating to how fast and how high a post prandial glucose response will be) foods containing fibers and carbohydrates from whole grains and certain vegetables and fruits may increase satiety (and thereby weight control) and mental focus, and facilitate blood sugar control in subjects with metabolic disorders, such as diabetics or pre-diabetics Furthermore, adding oil to carbohydrates tends to lower the glycemic response to a meal. Also, dietary fibers and omega-3 fatty acids have many of the same health benefits, but are effective through different modes of action, which opens the possibilities of synergistic and augmented health effects when these nutrients are combined.

While food products fortified with omega-3 fatty acids are currently available to the public, a typical serving size of these products generally provides meager amounts of these essential compounds. For example, one 8-oz. glass of Horizon Organic® Milk Plus DHA contains 32 mg of DHA, which is only a fraction of the recommended daily dose of this essential fatty acid. "Mr. Cookie" (http://www.goodfoods.ca) provides only 25 mg of DHA per 65 g serving of cookie. Moreover, the omega-3 fatty acids are typically in microencapsulated form to prevent their separation during production, storage and/or cooking of the food product. Accordingly, the present invention provides food products, and methods of making food products, that have a high omega-3 fatty acid content of at least about 50 g, e.g., 750-4000 mg, of omega-3 fatty acid per serving (e.g., 70 g or 80 g total weight). In addition, the food products include a significant amount of nutritional fibers and low glycemic index carbohydrates.

DEFINITIONS

As used herein, the term "concentrated fruit juice" and "concentrated vegetable juice" refers to fruit or vegetable juice from which a portion of the water has been removed. Processes for preparing concentrated fruit and vegetable juice are known in the art (see, e.g., Richard F. Matthews "Frozen Concentrated Orange Juice From Florida Oranges" Fact Sheet FS 8, a series of the Food Science and Human Nutrition, Florida Cooperative Extension Service, Institute of Food and Agricultural Sciences, University of Florida. April 1994, which is incorporated herein by reference in its entirety). The concentrated fruit or vegetable juice can include pulp fibers. As used herein, the term "pulp fibers" refers to that portion of a fruit or vegetable which remains in the juice after removal of the juice from the fruit or vegetable and typically includes various ratios of cellulose, mucilage, hemicellulose, lignin, pectic material (pectin), and other water insoluble materials. Suitable fruit juice concentrates that can be employed in the invention include, but are not limited to, concentrated orange juice, concentrated pine apple juice, concentrated grapefruit juice, concentrated cranberry juice, concentrated noni juice, concentrated acai juice, concentrated goji juice, concentrated blueberry juice, concentrated blackberry juice, and concentrated raspberry juice. Suitable vegetable juice concentrates that can be employed in the invention include, but are not limited to, concentrated carrot, concentrated beet or concentrated tomato juice.

The term "cooking" refers generally to the application of heat to food products in a domestic or industrial context and includes any form of heating, such as baking.

The term "cookie" as used herein is intended to include any baked product being similar to a cookie no matter what shape or form. For convenience, the invention will be described with reference to cookies, but it is to be understood that the term "cookie" as used herein is intended to generically cover the broad class of baked products such as cookies, biscuits, and similar baked products.

The term "homogenous" refers to an omega-3 fatty acid containing food product that does not exhibit substantial separation of the omega-3 fatty acid, even in the absence of encapsulation of the omega-3 fatty acid.

The term "serving" or "serving size" as used herein refers to FDA regulation 21 CFR 101.9(b) and 21 CFR 101.12 (herein incorporated by reference). The serving size typically appears on food labels and is based on FDA-established lists of "Reference Amounts Customarily Consumed Per Eating Occasion," which in most cases reflect the food quantities set forth in 21 CFR 101.12. Examples of serving sizes of the food products of the invention include, but are not limited to, approximately 5 g-150 g, e.g., 7 g-120 g, e.g., 10 g-90 g, e.g., 20 g-80 g, e.g., 30 g-70 g, e.g., 40 g-65 g, e.g., about 45-60 g. In one embodiment, the serving size is approximately 60-100 g, e.g., approximately 70 g or 80 g.

Similarly, the term "recommended daily dose" refers to the amount of recommended servings of a nutritional supplement (e.g., an omega-3 fatty acid, e.g., EPA, DPA, DHA and/or ALA).

The term "bite-sized" refers to a food product of a size that can be eaten in one bite, e.g., 15-20 g.

The term "manufactured food product" as used herein refers to a food product produced by combining two or more components, such that the food product does not exist in nature. Accordingly, manufactured food products of the present invention have undergone processing (e.g., mixing, kneading, stirring, whisking, cutting, chopping, mincing, pounding, pulverizing, macerating, milling, grinding, and/or, cooking, etc.).

The term "subject" refers to mammalian subjects, e.g., humans, dogs, cows, horses, pigs, sheep, goats, cats, mice, rabbits, and rats, that are capable of benefiting from omega-3 fatty acids.

The term "treat," "treated," "treating" or "treatment" includes the diminishment or alleviation of at least one symptom of a disease upon consuming the omega-3 fatty acid-containing food product of the invention. Treatment can be diminishment of one or several symptoms of a disorder or complete cure of a disorder.

The term "prevent" or "prevention" refers to reducing or abolishing the risk that some undesired health condition or disease may occur.

The term "combining" refers to the process whereby compounds are brought into a close relationship to result in a mixture in which each individual ingredient is present. Combining of ingredients (e.g., a fruit/vegetable juice concentrate, an oil containing an omega-3 fatty acid, and a fiber binding agent) can be done with any suitable mixing technique, including stiffing, whisking, pounding, pulverizing, macerating, milling, grinding, tumbling, etc.

Food Products Containing Omega-3 Fatty Acids

In one embodiment, the invention provides a method of producing a food product having an omega-3 fatty acid content, comprising combining a fruit juice concentrate or vegetable juice concentrate with an oil containing an omega-3 fatty acid to form a homogenous liquid mixture; and combining the liquid mixture with a fiber binding agent to form an edible food product. The method of the present invention is advantageous because it produces a food product that is homogenous, and contains high dosages of omega-3 fatty acids and dietary fibers without substantial separation of the omega-3 fatty acid from the food product, as well as little or no unpleasant taste associated with high dosages of omega-3 fatty acids per each serving unit. In a particular embodiment, the methods of the invention produce a food product that has a high omega-3 fatty acid content of at least about the recommended daily dose of 750 mg-4000 mg of omega-3 fatty acids. (See, e.g., Covington, *American Family Physician*, Vol. 70, No. 1, pp. 133-140, which is incorporated herein by reference in its entirety). The high omega-3 fatty acid content can be supplied by EPA, DHA or a combination thereof.

The omega-3 fatty acid component can be any fatty acid that includes a double bond at the third carbon from the omega position of the fatty acid. Omega-3 fatty acids suitable for the invention include EPA, DHA, docosapentaenoic acid (DPA) and/or alpha linolenic acid (ALA). The food product of the invention can contain one or more of these omega-3 fatty acids, e.g., EPA and DHA, in a variety of different ratios. For example, the omega-3 fatty acid component of the food product can include a ratio of EPA to DHA of about 1:6-6:1; or 10:1, 5:1, 2:1, 1:1, 1:2, 1:5 or 1:10; or 1:1-2:3 by volume, per serving of food product. In a particular embodiment, the omega-3 fatty acid is not encapsulated. In one embodiment of the method, the oil comprises approximately 5-20%, e.g., 10-20%, by weight, of the total solid food product. As used herein, the term "omega-3 fatty acid" can refer to either the omega-3 fatty acid itself (EPA, DHA, etc.), or, as described below an omega-3 fatty acid source (e.g., fish oil).

Any suitable source of omega-3 fatty acid can be used in the invention, including, but not limited to vegetable oils, marine oils such as fish oils and fish liver oils, and algae. Possible vegetable oil sources include olive oil, soybean oil, canola oil, high oleic sunflower seed oil, high oleic safflower oil, safflower oil, sunflower seed oil, flaxseed (linseed) oil, corn oil, cottonseed oil, peanut oil, evening primrose oil, borage oil, and blackcurrant oil. Suitable fish oils include cod liver oil, fish body oil, or krill derived oil. Other sources include salmon oil, cod oil, herring oil, mackerel oil, anchovy oil, anchovies, sardine oil, menhaden oil or shark liver oil. In one embodiment, the method of the invention uses an oil that contains at least 10%, e.g., at least 30%, omega-3 fatty acid. In a particular embodiment, the omega-3 fatty acid source is not encapsulated.

The methods of the invention further include the use of fruit juice or vegetable juice concentrate, which, when mixed with the omega-3 fatty acid source (e.g., fish oil), assists in suppressing the smell and/or taste of the oil in the food product. By suppressing the smell and/or taste of the omega-3 fatty acid, or the omega-3 fatty acid source (e.g., fish oil), one can load a higher concentration of the omega-3 fatty acid into a single serving of a food product without the consumer of the food product detecting the presence (i.e., smell and/or taste) of the omega-3 fatty acid in the food product.

Furthermore, by combining the omega-3 fatty acid with a fruit juice or vegetable juice concentrate, one can load a higher concentration of the omega-3 fatty acid into a single serving of a food product, without substantial separation of the omega-3 fatty acid from the food product The food products of the instant invention are also advantageous because, in addition to having a high content of omega-3 fatty acid, they also serve as a good source of dietary fiber. Dietary fiber is usually divided according to whether it is water-soluble or not. Both types of fiber are present in all plant foods, with varying degrees of each according to a plant's characteristics. Insoluble fiber possesses passive water-attracting properties that help to increase bulk, soften stool and shorten transit time through the intestinal tract. Soluble fiber undergoes metabolic processing via fermentation, yielding end-products with broad, significant health effects. For example, the skin of a plum is an example of an insoluble fiber source, whereas soluble fiber sources are in the pulp in the inside of the fruit. Other sources of insoluble fiber include whole wheat, wheat and corn bran, flax seed, lignans and vegetables such as celery, nopal, green beans, potato skins and tomato peel. Known sources of soluble fibers are peas, beans, oats, apples and carrots. Soluble fibers have been shown to decrease the cholesterol and lipid levels of those who consume them.

While not wishing to be bound by theory, it is believed that that the fruit juice or vegetable juice concentrate, when combined with the oily omega-3 fatty acid component (e.g., fish oil) forms an emulsion. In turn, this emulsion, when combined with fiber binding agent, results in a homogenous food product with an amount of omega-3 fatty acid that would not have been achieved without substantial separation of the oily omega-3 fatty acid. The emulsion may form due to the interaction of the omega-3 fatty acid with the high content of fibers (e.g., pectin) that remain in the concentrated fruit juice or concentrated vegetable juice. This is possibly due to the fibers (e.g., pectin) binding to the omega-3 fatty acids, thereby facilitating the formation of an emulsion. Without wishing to be bound by theory, by binding to the omega-3 fatty acids, the fibers from the concentrated fruit or vegetable juice interact with the omega-3 molecules and impede oxidation of the fatty acids, thereby preventing the degradation of the fatty acids in the food product. Accordingly, in one embodiment of the invention, pectin can be added to the mixture of omega-3 oil and concentrated fruit or vegetable juice to facilitate the formation of an emulsion.

The emulsion also can be mixed with a variety of additional ingredients (described herein), including oil or water soluble therapeutic agents and will not separate from those ingredients. As such, the emulsion, when combined with a fiber binding agent, results in, or, alternatively, can be used as an ingredient in, a food product that has a "high" omega-3 fatty acid content, meaning it can provide a subject with a recommended daily dose of essential omega-3 fatty acids in one serving.

Concentrated fruit juices that can be used in the food product of the invention include, but are not limited to, concentrated orange juice, concentrated grapefruit juice, concentrated pineapple juice, concentrated cranberry juice, or concentrated grape juice. In another embodiment, the concentrated juice can be concentrated banana juice, concentrated apple juice, concentrated pear juice, concentrated pomegranate juice, concentrated carrot juice or concentrated tomato juice. In one embodiment, the concentrated fruit or vegetable juice can be fortified, e.g., fortified orange juice. The proportion of the omega-3 fatty acid (e.g., omega-3 fatty acid source, e.g., oil) to concentrated fruit or vegetable juice is preferably approximately 0.5:4-2:1, e.g., approximately 1:2, by weight.

The present invention further includes the use of a fiber binding agent, which refers to any fiber source that can be added to the omega-3 fatty acid/concentrated fruit or vegetable juice composition to produce a solid, edible food product. The beneficial effects of combining fish oil with a fiber source (e.g., bran) are known in the art. For example, the combination of bran with fish oil offers considerable benefit in the management of hyperlipidemia (see, e.g., Topping et al., *Journal of Nutrition*, Vol. 120 No. 4, pp. 325-330, incorporated herein by reference in its entirety). The fiber binding agent also offers the advantages of binding the fish oil during the upper digestion period, thus providing both physiologically needed nutrients, roughage, and reduced risk of nausea often related to taking fish oil without food. Examples of suitable fiber binding agents include, but are not limited to, cracked wheat, multi-grain, flour, oats, oat bran, oatmeal, pumpernickel, rye, seven bran, twelve bran, seven grain, nine grain, stoned wheat, whole wheat, wheat berry, whole bran, millet, maze, quinoa, rice pectin, fruit peal, and fruit seeds and combinations thereof. Exemplary fiber binding agents include oats and whole wheat. The ratio of the omega-3 fatty acid/concentrated fruit/vegetable juice composition to the fiber binding agent is preferably approximately, 5:1, 4:1, 3:1, 2:1, 1:1, 1:2, 1:3, 1:4 or 1:5, by weight. In a particular embodiment, the ratio is about 1:2, by weight.

Once the omega-3-containing food product of the invention is prepared, it can be mixed (using known techniques) with additional food ingredients to improve taste, consistency and/or the ability to be cooked (e.g., baked). Such ingredients include, but are not limited to, water, sugar or other natural sweeteners, baking powder, baking soda, salt, eggs, egg whites, nuts or fruit. In one embodiment, the fruit is raisins, cranberries, blueberries, raspberries, papaya, pineapple, dried apples, bananas, ginger, dates, figs, orange peel, lemon peel and/or lime peel. In another embodiment, the nuts are hazel nuts, pecan nuts, walnuts, and/or butternuts. The food product can also include a combination of fruits and nuts. The ingredients also include spices, such as cinnamon, ginger, cloves, nutmeg and proteins like whey and other anti-oxidants. The ingredient can also include xanthan gum. Those skilled in the art will recognize, or be able to ascertain using no more than routine experimentation, many equivalent ingredients that can be used in combination with the omega-3-containing food product of the invention.

Other ingredients that may be included in the food product of the invention include, but are not limited to, enriched flour, white sugar, brown sugar, margarine, non-hydrogenated margarine, canola oil, non-hydrogenated canola oil, modified palm oil, palm oil, palm kernel oils, water, salt, milk, modified milk ingredients, soya lecithin, potassium sorbate, artificial flavoring, sugar, chocolate, chocolate liquor, cocoa butter, dextrose, soy lecithin, corn syrup, eggs, sodium bicarbonate, and baking powder. Alcoholic beverages, such as wine, can also be included in the food product as an ingredient.

Omega-3-containing food products of the invention additionally can include other oil and/or water soluble therapeutic agents. Because the food product is formed by an emulsion of an oily omega-3 fatty acid source and a hydrophilic fruit or vegetable juice, the additional therapeutic agents can be water-soluble or oil-soluble, including water-soluble or oil-soluble diet supplements or medicaments, including, but not limited to, antioxidants, cholesterol lowering drugs, antihypertensive drugs, anti-inflammation drugs, pain killers, hormones, anti-depressants, and/or weight loss medications.

Omega-3-containing food products of the invention also can contain minerals, such as calcium, magnesium, manganese, zinc, magnesium, iron, and phosphorus; and/or vitamins such as Vitamin A, the Vitamin B group, Vitamin C, D, E and K.

Omega-3-containing food products of the invention can be processed using any known technique (e.g., mixing, blending, kneading) to form an edible food containing the omega-3-containing food product. The food product also can be further processed by cooking (e.g., heating, baking, toasting, etc.). The result is a homogenous, edible omega-3-containing food product containing at least about 750 mg-4000 mg of omega-3 fatty acids per serving, without separation (or encapsulation) of the omega-3 fatty acid or unpleasant taste or odor. In one embodiment, the edible food comprises more than about 50 mg, more than about 500 mg, or about 1000-4000 mg of EPA, DHA, ALA, or DPA, individually or in some combination, per serving of foodstuff.

Edible food products of the invention include, but are not limited to, baked goods, pastas, condiments, soup mixes, snack foods, nut products, hard candies, soft candies, sauces, gravies, syrups, nutritional bars, cookies, jams or jellies, pet foods, bread, tortillas, cereal, ice cream, yogurt, milk, salad dressing, rice bran, crackers, muffins, or cakes. In a particular embodiment, the edible food is a cookie. In another embodiment, the edible food as a bread or "wrap" that employs a tomato paste in substitution for the concentrated juice. Thus, also provided herein is a manufactured food product comprising non-encapsulated omega-3 fatty acid and tomato paste.

Methods of Treatment Using Food Products Containing Omega-3 Fatty Acids

Due to the known beneficial effects of omega-3 fatty acids, and the ability to include other nutrients or therapeutic agents, omega-3 containing food products of the invention can be used to treat or prevent a wide variety of diseases and disorders.

Accordingly, the food products of the instant invention can be used, for example to prevent or reduce the risk of coronary heart disease, treat certain circulatory problems, such as varicose veins, stimulate blood circulation, stimulate the breakdown of fibrin, lower blood pressure, reduce blood triglyceride levels, reduce secondary and primary heart attack, treat rheumatoid arthritis, cardiac arrhythmias, depression, thrombosis and anxiety, as well as reduce the risk of ischemic and thrombotic stroke. The food products of the instant invention also can be used for the treatment of cancer or cancer prevention, such as breast, colon and prostate cancer. The food products of the invention can also be used to control the blood sugar of a subject with a metabolic disorder, e.g., diabetes, or prevent the passage from pre-diabetic stages to full diabetes.

In one embodiment, the omega-3 containing food products of the invention are used to treat autism, ADD, pre-dementia, depression, schizophrenia, epilepsy, macular degeneration, glaucoma, arthritis, weight control, weight loss, hair loss (alopecia) hypertension, dyslipidemia, diabetes, cognitive effects, Parkinson's disease, asthenia, sexual dysfunction, skin burns, infertility and HIV. In another embodiment, the omega-3 containing food products are used to reduce triglycerides in a subject. In still another embodiment, the omega-3 containing food products are used to reduce wrinkles in a subject. In yet another embodiment, the omega-3 containing food products can be used as an adjuvant to a cancer therapy.

In still another embodiment, the omega-3 containing food products can be used to improve weight control, weight loss, and cognitive functioning in a subject. In another embodiment, the omega-3 containing food products are used to reduce the plasma lipid profile of a subject.

In particular embodiments, the omega-3-containing food product contains additional therapeutic agents. Depending on the type of medicaments that are included in the food product (e.g., cholesterol lowering drugs such as statins, antihypertensive drugs, anti-inflammation drugs, pain killers, hormones, anti-depressants, medications to treat migraine, and/or weight loss medications), the food product can be used to treat any number of diseases and disorders in a subject.

Kits

Advantageously, the present invention also provides kits (e.g., pre-packaged mixes) for preparing the omega-3 containing food products of the invention. Omega-3 fatty acids are prone to oxidation/loss of effect by time, high temperature, light, and poor storage conditions. Thus, one advantage of such a kit is the ability to ship the pre-mixed ingredients of the invention to the consumer (e.g., a baker), so the consumer can produce a fresh food product containing a precise and predetermined high-dose of omega-3 fatty acids and fiber.

Kits of the invention comprise, at least in part, a) a fruit or vegetable juice concentrate with an oil containing an omega-3 fatty acid, and a fiber binding agent as described herein; and, optionally, b) instructions for preparing the omega-3 containing food products of the invention (e.g., a cookie having a high dose of an omega-3 fatty acid). For example, the instructions can include baking instructions, including how to blend the ingredients of the invention, how to measure the ingredients, proper baking temperature, proper baking times, packaging procedures, and storage requirements.

The kit can further include the additional food and/or nutritional ingredients described herein, including, but not limited to, sugar or other natural sweetener, baking powder, baking soda, salt, eggs, egg whites, nuts or fruit, as well as a water-soluble or oil-soluble diet supplement or medicament.

The kit as used in the instant application includes a container for containing the separate ingredients of the invention (e.g., a fruit or vegetable juice concentrate with an oil containing an omega-3 fatty acid, and a fiber binding agent, or some combination thereof), such as a divided container. The container can be in any conventional shape or form as known in the art which is made of an acceptable material, for example, a paper or cardboard box, a glass or plastic bottle or jar, or a re-sealable bag, such as a food-grade plastic bag. Furthermore, the kit can include one or more empty food-grade plastic bags with an FDA compliant label that can be used to carry the baked food product of the invention.

Equivalents

Those skilled in the art will recognize, or be able to ascertain using no more than routine experimentation, many equivalents to the specific embodiments of the invention described herein. Such equivalents are intended to be encompassed by the following claims.

Incorporation by Reference

The entire contents of all patents, published patent applications, websites, and other references cited herein are hereby expressly incorporated herein in their entireties by reference.

Exemplification

The invention is further illustrated by the following example. The example should not be construed as further limiting.

General Preparation of Food Product with High Omega-3 Fatty Acid Content

Fish oil (flavored or unflavored) is mixed with, preferably, frozen concentrated fruit or vegetable juice, e.g., orange juice, to form an emulsion with the oil. Optionally, pectin can be added to facilitate preparation of the emulsion. The emulsion is preferably kept cool or frozen, and separate from the dry baking ingredients until baking.

Exemplary cookie with High Omega-3 Fatty Acid Content: Recipe 1

150 g dark brown sugar
  365 g old fashioned rolled oats
  370 g whole wheat flour
  12 g baking soda
  2 g baking powder
  5 g salt
  40 g Ca citrate powder
  2.5 g ground cinnamon
  200 g dried cranberries
  85 g chopped walnuts
  7 g vanilla extract
  270 g egg whites
  260 g frozen, concentrated orange juice
  145 g Omega Cure omega-3 fish oil (http://www.omega-cure.com/)
  7 g vanilla extract The above ingredients are mixed, and then formed into round cookie shapes. The resulting cookie mixture is baked at 350° F. for 14 minutes, or alternatively 325° F. for 15 minutes, and then placed in the freezer after cooling to room temperature. This results in about 25 cookies weighing about 80 g each, containing 1000 mg EPA/DHA each or 2700 mg total omega-3 fatty acids (EPA/DPA/DHA).

Exemplary Cookie with High Omega-3 Fatty Acid Content: Recipe 2 (No sugar added)

790 g oats
  530 g whole wheat
  12 g baking soda
  12 g baking powder
  16 g cinnamon
  10 g powdered ginger
  10 g powdered cloves
  80 g calcium citrate
  50 g orange peel fiber
  4 g xanthan gum
  350 g fish oil with 30% concentration EPA/DHA
  650 g concentrated orange juice
  300 g egg white
  400 g cranberry flavored water
  80000 iu injection of liquid vitamin D (40 ml by syringe)
  500 g cranberries (or tropical fruits or chocolate chips)

The above ingredients are mixed, and then formed into round cookie shapes. The resulting cookie mixture is baked at 325° F. for 15 minutes, and then placed in the freezer after cooling to room temperature. This results in about 44 cookies weighing about 70 g each, containing 2300 mg EPA/DHA and 2 grams soluble dietary fibers. each or 2700 mg total omega-3 fatty acids (EPA/DPA/DHA). These cookies had a shelf life in room temperature of approximately 2-3 weeks, and a peroxide value (oxidation) below 10. These no-sugar cookies would be appealing for subjects with a metabolic disorder (such as type 2 diabetes), or any subject that could benefit from a low sugar, low Glycemic index food.

Human Studies Using an Exemplary Cookie with High Omega-3 Fatty Acid Content

Thirty seven humans were asked to participate in a trial study, eating 1 cookie (as described in recipe 1) every morning, every day for 6 weeks. The participants typically consumed little fish or omega-3 supplements.

At the beginning of the study a nurse drew blood and weighed the participants. The blood was sent to a lab to measure triglycerides, total cholesterol, HdL, LdL and blood sugar. A sub sample of blood was sent to a research center to measure the omega-3 index, which is a number that reflects the amount of omega-3 EPA/DHA incorporated into red blood cell membranes. The same procedures were repeated after 6 weeks, Every morning the participants were given a cookie containing a high dose of omega-3 fatty acid, and the cookie was eaten. Every Friday each participant got 2 extra cookies to eat at home during the weekend. Throughout the study the participants were asked to on comment cookie texture and taste.

The omega-3 content in the cells of the participants increased by 100% in 6 weeks. The participants also saw a reduction in triglycerides and cholesterol risk profile (10% improvement of the HdL/LdL ratio, which is typically not seen using omega-3 alone), and the participants reported increased satiety and less snacking. The participants did not notice any fishy taste or smell and the compliance to eating the cookie every day was exceptionally high (95%), showing that the invention has solved the resistance of the general consumer to fish oil products.

A laboratory also measured the fatty acid profile of the cookie, the shelf life with respect to yeast, mold and bacteria growth and peroxide levels, in addition to full nutritional fact labeling and fiber profile. The tests and studies confirmed that the omega-3 had not been diminished or oxidized by the food preparation and that the clinical lipid effects corresponded to the assumed fatty acid content in the cookie, as did the omega index increase.

The 10% improvement of the HdL/LdL ratio was not expected by the fish oil by itself and may reflect the effects of soluble dietary fibers.

In another study, another 20 humans were recruited to consume 1 exemplary cookie with high omega-3 fatty acid content per day for 12 weeks. The cookie was made according to recipe 1. During the study, omega-3 integration into red blood cell membranes was measured. The average starting value was about 4.3%, and the average value after 12 weeks was 8.6, with most of the increase obtained after 6 weeks. It is interesting to note that 4.3% is also the average value of omega-3 integration for Westerners, and 8% is the corresponding value found in the Japanese population, indicating that eating 1 cookie with high omega-3 fatty acid content per day will bring most Westerner's omega-3 levels up to that of a person living in Japan.

The invention claimed is:

1. A solid, edible food product comprising concentrated fruit juice, non-encapsulated fish oil sugar, oats, flour, baking soda, baking powder, salt, calcium citrate powder, cinnamon, vanilla extract, and egg whites, wherein the ratio of oil to concentrated juice is approximately 0.5:4-2:1 by weight, wherein the food product has about 750-4000 mg of omega-3 fatty acid per about 50-150 g serving, and wherein the food product does not exhibit substantial separation of the omega-3 fatty acid.

2. A solid, edible food product comprising a fiber-containing concentrated fruit juice, non-encapsulated fish oil sugar, oats, flour, baking soda, baking powder, salt, calcium citrate powder, cinnamon, vanilla extract, and egg whites, wherein the ratio of oil to concentrated juice is approximately 0.5:4-2:1 by weight, wherein the food product has about 750-4000 mg of omega-3 fatty acid per about 20-80 g serving, and wherein the food product does not exhibit substantial separation of the omega-3 fatty acid.

3. A solid, edible, food product having an omega-3 fatty acid content of at least about 750-4000 mg EPA and/or DHA per about 50-150 g serving, comprising a fiber-containing fruit juice concentrate or vegetable juice concentrate, a non-encapsulated oil containing an omega-3 fatty acid, and an additional fiber source, wherein the ratio of oil to concentrated juice is 1:1.5-1:2, by weight, and wherein the food product does not exhibit substantial separation of the omega-3 fatty acid.

4. The food product of claim 3, wherein the serving size is about 60-100 g.

5. A solid, edible, food product having an omega-3 fatty acid content of at least about 150-800 mg EPA and/or DHA per about 15-20 g serving, comprising a fiber-containing fruit juice concentrate or vegetable juice concentrate, a non-encapsulated oil containing an omega-3 fatty acid, and an additional fiber source, wherein the ratio of oil to concentrated juice is 1:1.5-1:2, by weight, and wherein the food product does not exhibit substantial separation of the omega-3 fatty acid.

6. The food product of claims 3 or 5, wherein the concentrated fruit juice is selected from the group consisting of concentrated orange juice, concentrated grapefruit juice, concentrated pineapple juice, concentrated grape juice, and concentrated cranberry juice; or wherein the concentrated vegetable juice is selected from the group consisting of concentrated beet, concentrated tomato and concentrated carrot juice.

7. The food product of claims 3 or 5, wherein the non-encapsulated oil is a fish oil or vegetable oil.

8. The food product of claims 3 or 5, wherein the fiber binding source comprises a grain selected from the group consisting of cracked wheat, multi-grain, flour, oats, oat bran, oatmeal, pumpernickel, rye, seven bran, twelve bran, seven grain, nine grain, stoned wheat, whole wheat, wheat berry, whole bran, millet, maze, quinoa, rice pectin, fruit peal, and fruit seeds and combinations thereof.

9. The food product of claims 3 or 5, further comprising sugar or other natural sweetener, baking powder, baking soda, salt, eggs, egg whites, nuts or fruit.

10. The food product of claims 3 or 5, further comprising cinnamon, ginger, cloves, nutmeg or whey.

11. The food product of claims 3 or 5, further comprising water-soluble or oil-soluble diet supplements or medicaments.

12. A method of producing a solid, edible food product having a high omega-3 fatty acid content of at least about 750-4000 mg EPA and/or DHA per serving, the method comprising:
  combining a fiber-containing fruit juice concentrate or vegetable juice concentrate with a non-encapsulated oil containing an omega-3 fatty acid to form a homogenous liquid mixture, wherein the ratio of oil to concentrated juice is approximately 0.5:4-2:1, by weight and wherein the oil is not encapsulated; and
  combining the liquid mixture with an additional fiber source at a ratio of about 1:2, by weight, to form a solid, edible food product, wherein the food product does not exhibit substantial separation of the omega-3 fatty acid.

13. The method of claim 12, wherein the liquid mixture is cool or frozen when combined with the fiber source.

14. The method of claim 12, wherein the oil comprises approximately 4-20%, by weight, of the total solid food product.

15. The method of claim 12, wherein the concentrated fruit juice is selected from the group consisting of concentrated orange juice, concentrated grapefruit juice, concentrated pineapple juice, concentrated grape juice, and concentrated cranberry juice; or wherein the concentrated vegetable juice is selected from the group consisting of concentrated beet, concentrated tomato and concentrated carrot juice.

16. The method of claim 12, wherein the non-encapsulated oil is a fish oil or vegetable oil.

17. The method of claim 12, wherein the fiber binding source comprises a grain selected from the group consisting of cracked wheat, multi-grain, flour, oats, oat bran, oatmeal, pumpernickel, rye, seven bran, twelve bran, seven grain, nine grain, stoned wheat, whole wheat, wheat berry, whole bran, millet, maze, quinoa, rice pectin, fruit peal, and fruit seeds and combinations thereof.

18. The method of claim 12, further comprising the step of adding an additional ingredient.

19. The method of claim 18, wherein the additional ingredient is sugar or other natural sweetener, baking powder, baking soda, salt, eggs, egg whites, nuts or fruit.

20. The method of claim 18, wherein the additional ingredient is cinnamon, ginger, cloves, nutmeg, or whey.

21. The method of claim 12, further comprising the step of adding water-soluble or oil-soluble diet supplements or medicaments.

22. The method of claim 12, further comprising the step of heating cooking the food product.

23. The food product of claim 1 or 2, wherein the ratio of oil to concentrated juice is approximately 1:1.5-1:2, by weight.

24. The food product of claim 1 or 2, wherein the oil comprises approximately 4-20% by weight of the total solid food product.

25. A method of producing a solid, edible food product having a high omega-3 fatty acid content of at least about 750-4000 mg EPA and/or DHA per serving, the method comprising:
  combining a fiber-containing fruit juice concentrate or vegetable juice concentrate with a non-encapsulated oil containing an omega-3 fatty acid to form a homogenous liquid mixture, wherein the ratio of oil to concentrated juice is approximately 1:1.5-1:2, by weight, and wherein the oil is not encapsulated; and
  combining the liquid mixture with an additional fiber source to form a solid, edible food product, wherein the food product does not exhibit substantial separation of the omega-3 fatty acid.

* * * * *

UNITED STATES PATENT AND TRADEMARK OFFICE
CERTIFICATE OF CORRECTION

PATENT NO. : 8,828,472 B2
APPLICATION NO. : 12/867087
DATED : September 9, 2014
INVENTOR(S) : Bo Martinsen It is certified that error appears in the above-identified patent and that said Letters Patent is hereby corrected as shown below:

In the Claims

Claim 1, column 13, line 3, insert a --,-- between "fish oil" and "sugar"

Claim 2, column 13, line 13, insert a --,-- between "fish oil" and "sugar"

Claim 8, column 13, line 56, delete "maze" and "peal" and insert --maize-- and --peel--

Claim 17, column 14, line 34, delete "maze" and "peal" and insert --maize-- and --peel--

Claim 22, column 14, line 47, delete "cooking"

Signed and Sealed this
Seventh Day of July, 2015

Michelle K. Lee
*Director of the United States Patent and Trademark Office*